United States Patent
Leung et al.

(10) Patent No.: US 12,085,946 B1
(45) Date of Patent: Sep. 10, 2024

(54) SYSTEM AND METHOD FOR EVALUATING THE PERFORMANCE OF A VEHICLE OPERATED BY A DRIVING AUTOMATION SYSTEM

(71) Applicant: BlueOwl, LLC, San Francisco, CA (US)

(72) Inventors: Theobolt N. Leung, San Francisco, CA (US); Eric Dahl, Newman Lake, WA (US)

(73) Assignee: QUANATA, LLC, San Francisco, CA (US)

( * ) Notice: Subject to any disclaimer, the term of this patent is extended or adjusted under 35 U.S.C. 154(b) by 909 days.

(21) Appl. No.: 17/073,448

(22) Filed: Oct. 19, 2020

Related U.S. Application Data

(63) Continuation of application No. 16/109,187, filed on Aug. 22, 2018, now Pat. No. 10,831,207.

(51) Int. Cl.
*B60W 50/04* (2006.01)
*G05D 1/00* (2006.01)
*G07C 5/08* (2006.01)

(52) U.S. Cl.
CPC ......... *G05D 1/0221* (2013.01); *B60W 50/045* (2013.01); *G05D 1/0088* (2013.01); *G07C 5/085* (2013.01)

(58) Field of Classification Search
None
See application file for complete search history.

(56) References Cited

U.S. PATENT DOCUMENTS

| | | | |
|---|---|---|---|
| 9,535,878 B1* | 1/2017 | Brinkmann | G08G 1/0112 |
| 10,055,794 B1 | 8/2018 | Konrardy et al. | |
| 10,077,056 B1* | 9/2018 | Fields | B60W 50/0098 |
| 10,127,570 B1* | 11/2018 | Cote | G06Q 30/0207 |
| 10,783,587 B1* | 9/2020 | Augustine | G06Q 40/08 |
| 10,909,629 B1* | 2/2021 | Madigan | G06F 11/3476 |
| 10,915,105 B1* | 2/2021 | Likhterman | B60W 60/0011 |
| 11,354,616 B1* | 6/2022 | Fields | G06Q 10/0639 |
| 2009/0132294 A1* | 5/2009 | Haines | G06Q 40/08 |
| | | | 701/117 |
| 2010/0063725 A1* | 3/2010 | Miura | G01C 21/26 |
| | | | 701/408 |

(Continued)

*Primary Examiner* — Justin S Lee
(74) *Attorney, Agent, or Firm* — BRYAN CAVE LEIGHTON PAISNER LLP

(57) ABSTRACT

Methods and systems for assessing driving autonomous system (DAS) performance based on the telematics data, vehicle type, and/or driving environment. The methods and/or systems may receive driving data indicative of vehicle performance based on DAS operation of the vehicle during a time period; select a portion of the driving data related to at least one performance metric of the DAS operated vehicle during the time period; receive historical DAS performance data that includes at least one performance metric of a vehicle-type of DAS operated vehicle that includes the vehicle; analyze the selected portion of the driving data during the time period with the historical DAS performance data; calculate a DAS score for the vehicle based on the analysis of the selected portion of the driving data during the time period with the historical DAS performance data of the vehicle type; and adjust DAS operation of the vehicle based on the calculated DAS score for the vehicle.

20 Claims, 8 Drawing Sheets

(56) References Cited

U.S. PATENT DOCUMENTS

| | | | |
|---|---|---|---|
| 2015/0175168 A1* | 6/2015 | Hoye | B60W 40/08 434/64 |
| 2017/0309092 A1* | 10/2017 | Rosenbaum | G07C 5/0808 |
| 2018/0164825 A1* | 6/2018 | Matus | G08G 1/096725 |
| 2018/0364725 A1* | 12/2018 | Lonari | G05D 1/0291 |
| 2019/0011918 A1* | 1/2019 | Son | G01C 21/3617 |
| 2019/0225232 A1* | 7/2019 | Blau | G05D 1/0088 |
| 2019/0384292 A1 | 12/2019 | Aragon et al. | |

* cited by examiner

|  | Cornering G-Force Threshold | | | |
|  | 342 | 343 | 344 | 345 |
| Year/Make/Model | H & M | Light | Moderate | Severe |
| 2017 Ford Econoline | 0.95 | 0.250 | 0.350 | 0.450 |
| 2017 Chevrolet Blazer 2 WD | 1.02 | 0.282 | 0.382 | 0.482 |
| 2017 Ford Explorer 2dr WD | 1.06 | 0.303 | 0.403 | 0.503 |
| 2017 Ford Explorer 4dr 4WD | 1.06 | 0.303 | 0.403 | 0.503 |
| 2017 Toyota 4Runner 4WD | 1.06 | 0.310 | 0.410 | 0.510 |
| 2017 Ford Ranger p/u 4WD | 1.07 | 0.308 | 0.408 | 0.508 |
| 2017 Jeep Cherokee 4WD | 1.08 | 0.313 | 0.413 | 0.513 |
| 2017 Acura SLX / Isuzu Trooper 4WD | 1.09 | 0.318 | 0.418 | 0.518 |
| 2017 Ford Aerostar 2WD | 1.10 | 0.323 | 0.423 | 0.523 |
| 2017 Chevrolet Astro 2WD | 1.12 | 0.333 | 0.433 | 0.533 |
| 2017 Chevrolet/Geo Tracker 4WD | 1.13 | 0.338 | 0.438 | 0.538 |
| 2017 Chevrolet K1500 p/u 4WD | 1.14 | 0.343 | 0.443 | 0.543 |
| 2017 Ford Ranger p/u 2WD | 1.17 | 0.359 | 0.459 | 0.559 |
| 2017 Ford F-150 p/u 2WD | 1.18 | 0.364 | 0.464 | 0.564 |
| 2017 Honda CR-V 4WD | 1.19 | 0.369 | 0.469 | 0.569 |
| 2017 Ford F-150 p/u 2WD | 1.19 | 0.369 | 0.469 | 0.569 |
| 2017 Dodge Caravan / Plymouth Voyager 2WD | 1.21 | 0.370 | 0.470 | 0.570 |
| 2017 Chevrolet C1500 p/u 2WD | 1.22 | 0.384 | 0.484 | 0.584 |
| 2017 Dodge Caravan / Plymouth Voyager 2WD | 1.23 | 0.389 | 0.489 | 0.589 |
| 2017 Ford Windstar 2WD | 1.24 | 0.394 | 0.494 | 0.594 |
| 2017 Chevrolet / Geo Metro | 1.29 | 0.420 | 0.520 | 0.620 |
| 2017 Chevrolet Cavalier | 1.32 | 0.435 | 0.535 | 0.635 |
| 2017 Chevrolet Caprice | 1.40 | 0.476 | 0.576 | 0.676 |
| 2017 Chevrolet Impala | 1.40 | 0.450 | 0.550 | 0.650 |
| 2017 Ford Taurus | 1.45 | 0.501 | 0.601 | 0.701 |
| 2017 Honda Civic | 1.48 | 0.516 | 0.616 | 0.716 |
| 2017 Chevrolet Camaro | 1.50 | 0.550 | 0.650 | 0.750 |

FIG. 5A

|  | Acceleration G-Force Thresholds | | | |
|---|---|---|---|---|
|  | 349 | 346 | 347 | 348 |
| Vehicle Type | 0-60 | Light | Moderate | Severe |
| 2017 Chevrolet Corvette ZR1 | 3.30 | 4.5 | 5.5 | 7 |
| 2017 Chevrolet Camaro | 4.80 | 4.4 | 5.2 | 6.5 |
| 2017 ChRYSLER 300C | 5.50 | | | |
| 2017 Mitsubishi Eclipse | 6.10 | | | |
| 2017 Hyundai Azera | 6.20 | | | |
| 2017 Ford Edge | 7.00 | | | |
| 2017 Nissan Quest | 8.20 | | | |
| 2017 Toyota Camry | 8.30 | 3 | 4 | 5 |
| 2017 Chevrolet Impala | 8.90 | | | |
| 2017 Chevrolet Silverado 1500 | 9.10 | | | |
| 2017 Toyota Prius | 10.90 | | | |
| 2017 Ford Transit Connect | 12.00 | | | |
| 2017 Ford Econoline | 12.00 | 2.7 | 3.5 | 4 |
| 2017 Toyota Land Cruiser | 14.90 | | | |
| 2017 Volvo V70 | 15.60 | | | |
| 2017 Volkswagen Routan | 16.00 | 2.5 | 3.2 | 3.8 |

FIG. 5B

| | Braking G-Force Thresholds | | | |
| --- | --- | --- | --- | --- |
| | | 351 | 352 | 353 | 350 |
| Vehicle Type | 60-0 in feet by 10% | Light | Moderate | Severe | 60-0 in feet |
| 2017 Chevrolet Corvette ZR1 | 10.1 | | | | 101 |
| 2017 Chevrolet Camaro | 11.5 | 4 | 5 | 6 | 115 |
| 2017 Hyundai Azera | 12.2 | | | | 122 |
| 2017 Mitsubishi Eclipse | 12.7 | 3.5 | 4.5 | 5.5 | 127 |
| 2017 Toyota Camry | 12.7 | | | | 127 |
| 2017 Ford Transit Connect | 12.9 | | | | 129 |
| 2017 Volkswagen Routan | 13 | | | | 130 |
| 2017 Volvo V70 | 13.1 | | | | 131 |
| 2017 Toyota Prius | 13.1 | | | | 131 |
| 2017 Ford Edge | 13.4 | | | | 134 |
| 2017 Nissan Quest | 13.9 | | | | 139 |
| 2017 Chevrolet Impala | 14.1 | | | | 141 |
| 2017 Chevrolet Silverado 1500 | 15 | | | | 150 |
| 2017 Toyota Land Cruiser | 15 | | | | 150 |
| 2017 Ford Econoline | 16.7 | 3 | 4 | 5 | 167 |

FIG. 5C

SYSTEM AND METHOD FOR EVALUATING THE PERFORMANCE OF A VEHICLE OPERATED BY A DRIVING AUTOMATION SYSTEM

CROSS-REFERENCE TO RELATED APPLICATION

The present application is a continuation of U.S. Patent Application No. 16/109,187. filed on Aug. 22, 2018. the entire disclosure of which is hereby expressly incorporated herein by reference.

FIELD OF THE DISCLOSURE

The present disclosure generally relates to assessing the performance of a vehicle operated in a specific environment or operational design domain (ODD) and specific dynamic driving task (DDT) by a specific driving automation system (DAS) feature and, more particularly, to systems and methods for utilizing driving data from vehicles, ODDs, DDTs, environment (e.g., weather, road conditions, traffic), and/or vehicle types to evaluate performance of a vehicle under operation by DASs.

BACKGROUND

A vehicle can be operated by a DAS feature to replace or augment human-operator control commands to drive the vehicle in whole or in part. Performance characteristics of a vehicle operated by a DAS feature for specific DDTs such as cruising on a divided highway, may involve maneuvering and/or handling characteristics or aspects, including, for example, an acceleration characteristic (e.g., "0-60 mph" measurement), a braking characteristic (e.g. vehicle stoppage at a distance of 45 feet from 30 mile per hour), a fuel or battery efficiency characteristic (e.g., 25 miles per gallon or 300 kwh/m, which may be dependent on a type of driving condition (e.g., city, highway), a ground pressure characteristic, a power-to-weight ratio, a static stability characteristic (e.g., rollover resistance, cornering characteristic), and/or other metrics. Metrics for a DAS's feature performance may vary greatly among different types of vehicles, e.g., year, make, model, body style as well as specific vehicles as they learn and age. For example, a sportier vehicle type may be expected to maneuver or handle differently than a sedan, SUV, or minivan and the respective metrics of the DAS for such capabilities among the different vehicle types may be reflective of their differences in this regard.

The performance metrics of vehicles operated by driving automation system (DAS) may be used by one or more entities for one or more purposes. For example, prospective purchasers may refer to these metrics when considering which vehicle type (e.g., make and/or model) and which DASs or features to buy, such as Tesla's Autopilot, Auto lane-change or Autopark; Audi's Traffic Jam Assist; GM/Cadillac's Super Cruise. Automobile manufacturers may use these metrics to price and/or market vehicles and DAS features, vehicle insurance providers may use these metrics to rate vehicles, and other entities may use the performance metrics for other purposes. Unfortunately, proclaimed performance of vehicles operated by DASs may be difficult to assess with respect to maneuvering and/or handling characteristics, vehicle type, and/or driving environment. Accordingly, it may be beneficial to provide an evaluation of the performance of vehicles operated by DAS features based on telematics data that is analyzed according to the make and model of the vehicle and/or the ODD or driving context (e.g., driving environment), with respect to purported performance claims and/or to a standard of performance for the vehicles operated by DASs or specific features.

SUMMARY

In accordance with the described embodiments, the disclosure herein is directed to systems and methods for evaluating a vehicles operated by a driving automation system (DAS).

In one embodiment, a computer-implemented method includes receiving, by a mobile computing device including one or more telematics sensors and operatively coupled to a vehicle, driving data indicative of vehicle performance based on driving automation system (DAS) operation of the vehicle during a time period; selecting, by the mobile computing device, a portion of the driving data related to at least one performance metric of the DAS operation of the vehicle during the time period; receiving, by the mobile computing device, historical DAS performance data that includes the at least one performance metric of a vehicle type that includes the DAS operated vehicle; analyzing, by the mobile computing device, the selected portion of the driving data during the time period with the historical DAS performance data; calculating, by the mobile computing device, a DAS score for the vehicle based on the analysis of the selected portion of the driving data during the time period with the historical DAS performance data of the vehicle type; and adjusting, by the mobile computing device, the DAS operation of the vehicle based on the calculated DAS score for the vehicle.

In another embodiment, a computer-implemented method includes receiving, by a mobile computing device including one or more telematics sensors and operatively coupled to a vehicle, driving data indicative of vehicle performance based on driving automation system (DAS) operation of the vehicle during a time period; selecting, by the mobile computing device, a portion of the driving data related to at least one performance metric of the DAS operation of the vehicle during the time period; receiving, by the mobile computing device, historical DAS performance data that includes the at least one performance metric of a vehicle type that includes the DAS operated vehicle; analyzing, by the mobile computing device, the selected portion of the driving data during the time period with the received historical DAS performance data; receiving, by the mobile computing device, driving context data indicative of a driving environment for the DAS operated vehicle during the time period of the selected portion of the driving data; selecting, by the mobile computing device, a portion of the driving context data contemporaneous with the selected portion of the driving data; analyzing, by the mobile computing device, the selected portion of the driving data with the selected portion of the driving context data; calculating, by the mobile computing device, a DAS score for the vehicle based on the analysis of the selected portion of the driving data during the time period with the historical DAS performance data of the vehicle type, and the analysis of the selected portion of the driving data with the selected portion of the driving context data; and adjusting, by the mobile computing device, the DAS operation of the vehicle based on the calculated DAS score for the vehicle.

In a further embodiment, a mobile computing device for operatively coupling to a vehicle operated by a driving automation system (DAS) to evaluate DAS vehicle performance includes one or more processors coupled to one or more memory devices; one or more telematics sensors coupled to the one or more processors; a user interface coupled to the one or more processors; a communication module operatively coupled to the one or more processors and facilitating wired and/or wireless communication with the mobile computing device; and a scoring module including instructions, which when executed by the one or more processors, causes the system to: receive, via the one or more telematics sensors, driving data indicative of vehicle performance based on DAS operation of the vehicle during a time period; select a portion of the driving data related to at least one performance metric of the DAS operation of the vehicle during the time period; receive historical DAS performance data that includes the at least one performance metric of a vehicle type that includes the DAS operated vehicle; analyze the selected portion of the driving data during the time period with the historical DAS performance data; calculate a DAS score for the vehicle based on the analysis of the selected portion of the driving data during the time period with the historical DAS performance data of the vehicle type; and adjust the DAS operation of the vehicle based on the calculated DAS score for the vehicle.

BRIEF DESCRIPTION OF THE DRAWINGS

Advantages will become more apparent to those skilled in the art from the following description of the preferred embodiments that have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 5A, 5B, and 5C depict example charts depicting example threshold data for a variety of vehicles.

DETAILED DESCRIPTION

Figure 1:
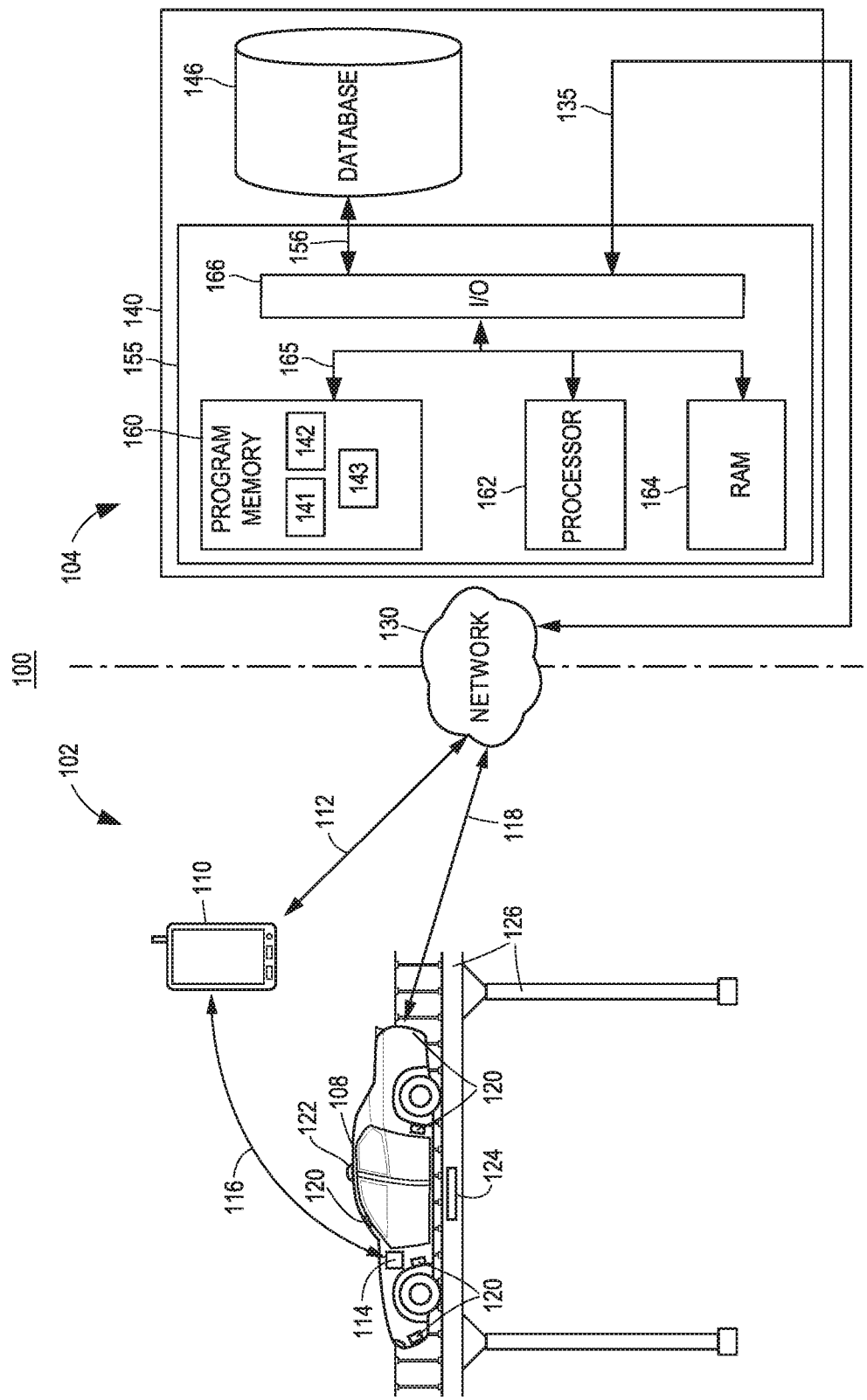
FIG. 1 illustrates a block diagram of an exemplary system including a network, a computer server, a mobile computing device, and an on-board computer for monitoring and evaluating DAS operation in accordance with the described embodiments.

The methods and systems described herein generally relate to assessing the performance of a DAS-operated vehicle. DAS operation of the vehicle may include full control of the vehicle under certain conditions, that is, complete autonomous operation, or the DAS may assist a human operator in operating the vehicle, that is, partial or semi-autonomous operation. Full autonomous operation may include systems within the vehicle that pilot the vehicle to a destination with or without a human operator present, for example, a driverless vehicle. Partial or semi-autonomous operation may assist the human operator in limited ways, for example, automatic braking or collision avoidance.

More specifically, the methods and systems are directed to evaluating a DAS operator or driver, for example, a DAS driving package or module. Monitored performance of the DAS may be assessed in relation to the proclaimed performance capability of the DAS or a standard of performance for the DAS. To score or rank the operation of the DAS, the actual performance of the DAS may be compared to its proclaimed capabilities or characteristics, and/or to similar or different types of other DASs or groups thereof. Consideration of the vehicle type that the DAS is integrated therein/therewith, and/or the driving environment (road condition, weather, traffic, etc.) during DAS operation may also be included in the evaluation of the performance of the DAS.

Performance features of a DAS are generally related to drivability, where configurations and settings for DAS operation affect the handling and maneuverability of the vehicle. Some performance characteristics or features may vary with respect to vehicle type, i.e., make and/or model. The performance characteristics may also be affected by and/or adapted to a driving environment or context during DAS operation, such as the driving surface and/or its condition, weather, city/rural/highway driving, traffic congestion, etc. Some features or aspects of the DAS may be enabled or disabled individually or in groups. For example, a mode of operation for the DAS may be selected or adjusted for one or more DAS features, vehicle types, and/or driving environment.

An analysis of how a DAS facilitates avoiding accidents and/or mitigates the severity of accidents may be used to build a database and/or model of risk assessment. After which, scoring and/or ranking DASs may be compiled and/or updated based upon autonomous or semi-autonomous functionality, vehicle type, and/or vehicle usage context, e.g., driving conditions, road conditions, weather conditions, etc. In one aspect, an evaluation may be performed on how DAS operation compares across vehicle types, driving context, or proclaimed DAS feature performance stated within promotional material. Additional aspects may also facilitate risk assessment and/or premium determination for vehicle insurance policies covering vehicles with DAS features. For instance, a consumer's insurance policy may be based wholly or partially on DAS driving data related to a particular vehicle type provided to a vehicle insurance provider.

The types of DAS functionality or technology that may be used with the present embodiments to replace human operator/driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (1) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. Additionally or alternatively, the autonomous or semi-autonomous functionality or technology may include and/or may be related to: (t) driver alertness or responsive monitoring; (u) pedestrian detection; (v) artificial intelligence and/or back-up systems; (w) navigation or GPS-related systems; (x) security and/or anti-hacking measures; and/or (y) theft prevention systems.

An evaluation of DAS performance may consider the impact of the autonomous functionality or technology on the likelihood of a vehicle accident or collision occurring. For instance, a processor may analyze historical accident information and/or test data involving vehicles having autonomous or semi-autonomous DAS functionality. Factors such as driving environment and context may be analyzed and/or accounted for that are related to DAS functionality, accident information, or test data may include (1) point of impact; (2) type of road; (3) time of day; (4) weather conditions; (5) road construction; (6) type/length of trip; (7) vehicle style; (8) level of pedestrian traffic; (9) level of vehicle congestion; (10) atypical situations (such as manual traffic signaling); (11) availability of internet connection for the vehicle; and/or other factors. These types of factors may also be weighted according to historical accident information, predicted accidents, vehicle trends, test data, and/or other considerations.

Benefits of one or more autonomous or semi-autonomous DAS functionalities or capabilities may be determined, weighted, and/or otherwise characterized. For instance, the benefit of certain autonomous or semi-autonomous DAS functionality may differ with respect to the type of vehicle integrated therewith. Additionally, or alternatively, the benefit of some DAS functionality may be greater in city or congested traffic, as compared to open road or rural driving traffic. Further, certain autonomous or semi-autonomous DAS functionality may be more effective below a certain speed, e.g., during city driving or driving in congestion. Other autonomous or semi-autonomous DAS functionality may operate more effectively on the highway and away from city traffic, such as cruise control. Some autonomous or semi-autonomous DAS functionality may be impacted by weather, such as rain or snow, and/or time of day (day light versus night). As an example, fully automatic or semi-automatic lane detection warnings may be impacted by rain, snow, ice, and/or the amount of sunlight (all of which may impact the imaging or visibility of lane markings painted onto a road surface, and/or road markers or street signs).

Evaluations or rankings of DAS functionality may be adjusted based upon the type of DAS, vehicle type, and/or driving environment, e.g., weather, traffic, time of day, etc. Such assessments may further be adjusted based upon the extent of use of the DAS features, including settings or modes impacting the operation of the DASs. Information related to the vehicle type and/or driving environment during evaluation may be included in a comparison to proclaimed performance capabilities and/or performance standards of similar or different DAS implementation, e.g., autonomous driving packages, and/or vehicle types.

DAS performance information for a particular vehicle may be gathered over time and/or via remote wireless communication with the vehicle. For example, a mobile computing device may be coupled to the vehicle to monitor in real-time the DAS and/or the use of DAS features while the vehicle is operating. Other types of monitoring may be performed remotely, such as via wireless communication between the vehicle and a remote server, or wireless communication between a vehicle-coupled computing device that is configured to gather autonomous or semi-autonomous functionality usage information and a remote server.

In one embodiment, an electronic device is operatively coupled to the DAS and may be equipped with one or more sensors to record telematics data of a vehicle (for example, acceleration data, braking data, cornering data, and/or other data) during DAS operation of the vehicle. The electronic device may be a portable device such as a mobile computing device and/or mobile phone, which may be equipped with one or more sensors to detect various telematics data during DAS operation of the vehicle. Additionally, or alternatively, the electronic device and/or the one or more sensors may be fixedly or removably attached to the DAS-operated vehicle. The telematics data or portions thereof may be evaluated in comparison to historical performance data of a similar type of DAS-operated vehicle that includes the evaluated DAS. A performance score for the DAS and/or one or more particular features of the DAS may be calculated to reflect the DAS's actual performance with respect to the vehicle type, driving context, proclaimed performance of the DAS, and/or the historical performance of other DASs of similar type.

The electronic device may be configured to transmit the calculated score to a remote entity. Alternatively, the electronic device may transmit the telematics data received via the one or more sensors to the remote entity, wherein the remote entity may calculate the performance score of the DAS. The electronic device and/or the remote entity may include a distribution of the various DAS performance metrics for one or more types of DASs. In some instances, the performance score can indicate thresholds for a range of parameters for each of the DAS metrics based on a particular vehicle type and/or driving context. For example, a sports car may have a greater threshold related to acceleration, braking, or cornering than an SUV.

Additionally, in some embodiments, the vehicle may transmit and/or receive communications to or from external sources, such as other vehicles (V2V), infrastructure (e.g., a bridge, traffic light, railroad crossing, toll both, marker, sign, or other equipment along the side of a road or highway), pedestrians, databases, or other information sources external to the vehicle. Such communication may allow the vehicle to obtain information regarding other vehicles, obstacles, road conditions, or environmental conditions that could not be detected by sensors disposed within the vehicle. For example, V2V communication may allow a vehicle to identify other vehicles approaching an intersection even when the direct line between the vehicle and the other vehicles is obscured by buildings. As another example, the V2V wireless communication from a first vehicle to a second vehicle (following the first vehicle) may indicate that the first vehicle is braking, which may include the degree to which the vehicle is braking. In response, the second vehicle may automatically or autonomously brake in advance of detecting the deceleration of the first vehicle based upon sensor data.

The DAS performance score may be used for various purposes. For instance, the calculated performance score of the DAS may provide a more objective perspective of the proclaimed performance capabilities where DAS performance of similar type vehicles can be grouped, scored, or ranked based on actual overall performance and/or individual DAS features, aspects, or characteristics. Additionally, the DAS may be adjusted based on the DAS performance score as it relates to the vehicle type and/or driving context. That it, DAS functionality of a particular vehicle type and/or usage within a particular driving context (e.g., weather, traffic, road condition) can be adjusted based on the DAS performance score as it relates to the corresponding vehicle type, and/or driving context. It should be appreciated that other uses and benefits may be attained from the calculated DAS performance score.

Although the following detailed description includes numerous different embodiments, it should be understood that the legal scope of the invention is defined by the words of the claims set forth further below. The detailed description is to be construed as exemplary only and does not describe every possible embodiment, as describing every possible embodiment would be impractical, if not impossible. One could implement numerous alternate embodiments, using existing and/or yet-to-be developed technology, which would still fall within the scope of the claims.

FIG. 1 illustrates a block diagram of an exemplary DAS scoring system 100 on which the exemplary methods described herein may be implemented. The high-level architecture includes both hardware and software applications as well as various data communication channels for communicating data between the various hardware and software components. The system 100 may be configured into front-end components 102 and back-end components 104. The front-end components 102 may obtain information relating to a DAS 108 (e.g., an automobile, truck, motorcycle, etc.) and its surrounding operating environment. An on-board computing device 114 may utilize this information to operate the vehicle 108 according to a DAS operation or feature or to assist a human vehicle operator in operating the vehicle 108. To monitor and/or record performance of the vehicle 108, the front-end components 102 may include a mobile computing device 110 (e.g., a smart phone, a tablet computer, a special purpose computing device, etc.) to determine when the vehicle is in DAS operation and information regarding the vehicle. One or more sensors 120 may be operably coupled to the vehicle 108 and/or the mobile computing device 110 and may communicate with the mobile device 110 and/or the on-board computer 114. The front-end components 102 may further process the sensor 120 data using the mobile computing device 110 and/or the on-board computer 114. For example, the mobile computing device 110 may receive data from the front-end components 102 (e.g., one or more sensors 120) and determine the use and effectiveness of the DAS features of the vehicle 108. In some embodiments of the system 100, the front-end components 102 may communicate with the back-end components 104 via a network 130. Either the on-board computer 114 or the mobile device 110 may communicate with the back-end components 104 via the network 130 to allow the back-end components 104 to receive and/or record information regarding DAS usage. The back-end components 104 may also use one or more servers 140 to receive data from the front-end components 102 and determine the use and effectiveness of DAS features of the vehicle 108.

Some of the front-end components 102 may be disposed within or communicatively connected to the mobile device 110 and/or the on-board computer 114. The mobile device 110 and/or the on-board computer 114 may interface and communicate with the one or more sensors 120 (e.g., a vehicle occupant sensor, an ignition sensor, an odometer, a system clock, a speedometer, a tachometer, an accelerometer, a gyroscope, a compass, a geolocation unit, a camera, a distance sensor, etc.), which sensors 120 may or may not be incorporated within the mobile device 110. The mobile device 110 and/or the on-board computer 114 may also interface and communicate with the one or more external sensors 126 associated with the driving environment or context of the DAS. The external sensors 126 may detect conditions relating to infrastructure, weather, traffic, etc., encountered by the DAS 108. The front-end components 102 may further include a communication component 122 to transmit information to and receive information from external sources, including other sensors 126, vehicles, infrastructure, or the back-end components 104. In some embodiments, the mobile device 110 may supplement or perform all of the functions performed by the on-board computer 114 and/or the mobile device 110 described herein by, for example, sending or receiving information to/from the server 140 via the network 130. In other embodiments, the on-board computer 114 may supplement or perform all of the functions of the mobile device 110 described herein, in which case no mobile device 110 may be present in the system 100. Either or both of the mobile device 110 or on-board computer 114 may communicate with the network 130 over links 112 and 118, respectively. Additionally, the mobile device 110 and on-board computer 114 may communicate with one another directly over a wired and/or wireless communication link 116.

The mobile device 110 monitoring performance of the DAS may include a dedicated vehicle computing device or a general-use personal computing device, cellular phone, smart phone, tablet computer, phablet, wearable electronic, PDA (personal digital assistant), smart device (glasses, watch, band), pager, and the like, configured for wired or wireless radio frequency (RF) communication. Although only one mobile device 110 is illustrated, it should be understood that a plurality of mobile devices 110 may be used in some embodiments. Similarly, the on-board computing device 114 may include a dedicated or general-use computing device capable of performing functions relating to DAS operation. The on-board computer 114 may be installed by the original manufacturer of the vehicle 108 or as an aftermarket modification or addition to the vehicle 108. In some embodiments or under certain conditions, the mobile device 110 or on-board computer 114 may function as thin-client devices that outsource some portion of the processing to the server 140.

Any of the sensors 120 may be integrated within the mobile device 110 and/or the on-board computing device 114, as well as removably or fixedly installed to the vehicle 108 and disposed in various configurations to provide data related to the DAS features. Some of the sensors 120 may include a global positioning system (GPS) unit or other satellite-based navigation unit, a radar unit, a Light Detection and Ranging unit (LIDAR) unit, an ultrasonic sensor, an infrared sensor, a camera, an accelerometer, a tachometer, a speedometer, as well as any other sensor that may be appropriate for DAS operation of the vehicle. Some of the sensors 120 (e.g., radar, LIDAR, or camera units) may actively or passively scan the driving environment for driving context including weather conditions and nearby obstacles (e.g., other vehicles, buildings, pedestrians, etc.), lane markings, signs, or signals. Some of the sensors 120 (e.g., GPS, accelerometer, or tachometer units) may provide data for determining the location or movement of the vehicle 108. Some of the sensors 120 may be directed to the interior or occupant compartment of the vehicle 108, such as cameras, microphones, pressure sensors, thermometers, or similar sensors to monitor the occupants within the vehicle 108. Information generated or received by the sensors 120 may be communicated to the on-board computer 114 or the mobile device 110 for use in operating, monitoring, and/or evaluating performance of the DAS.

In some embodiments, the mobile device 110 and/or communication component 122 may receive information from the external sensors 126 and/or sources, such as other vehicles, weather observation/recording services (e.g., weather observation, etc.), or infrastructure (e.g., roads, bridges, traffic related alerts, etc.). The mobile device 110 and/or communication component 122 may also send information regarding the vehicle 108 to external sources via a transmitter and a receiver designed to operate according to desired specifications, such as the dedicated short-range communication (DSRC) channel, wireless telephony, Wi-Fi, or other existing or later-developed communications protocols. The information received from the external sensors 126 and/or sources may supplement the data received from other sensors 120 to implement the DAS features. For example, the mobile device 110 and/or the communication component 122 may receive information that a DAS positioned ahead of the vehicle 108 is encountering icy road conditions and/or reducing speed, enabling appropriate adjustments to the DAS operation of the vehicle 108.

In further embodiments, the front-end components 102 may include an infrastructure communication device 124 for monitoring the status of one or more infrastructure components. The infrastructure communication device 124 may include or be communicatively connected to the one or more external sensors 126 for detecting information relating to the condition of the infrastructure component. The external sensors 126 may generate data relating to weather conditions, traffic conditions, or operating status of the infrastructure component. The infrastructure communication device 124 may be configured to receive the generated sensor data and determine a condition of the infrastructure component, such as weather related conditions (e.g., icy bridge surfaces), road integrity, construction, traffic, available parking spaces, etc. The infrastructure communication device 124 may further be configured to communicate information to the vehicle 108 via the mobile device 110 and/or the communication component 122. In some embodiments, the infrastructure communication device 124 may receive information from the vehicle 108, while, in other embodiments, the infrastructure communication device 124 may only transmit information to the vehicle 108.

In addition to receiving information from the sensors 120 and external sensors 126, the mobile device 110 and/or the on-board computer 114 may directly or indirectly control the operation of the vehicle 108 according to various DAS features. The DAS features may be implemented via software applications or routines executed by the mobile device 110 and/or the on-board computer 114 to control the steering, braking, or throttle of the vehicle 108. To facilitate such control, the mobile device 110 and/or on-board computer 114 may be communicatively connected to the controls or components of the vehicle 108 by various electrical or electromechanical control components (not shown). In embodiments involving full DAS operation, the vehicle 108 may be operable only through such control components (not shown). In other embodiments, the control components may be disposed within or supplement other vehicle operator control components (not shown), such as steering wheels, accelerator or brake pedals, or ignition switches.

In some configurations, the front-end components 102 may communicate with the back-end components 104 via the network 130. The network 130 may be a proprietary network, a secure public internet, a virtual private network or some other type of network, such as dedicated access lines, plain ordinary telephone lines, satellite links, cellular data networks, and combinations thereof. Where the network 130 comprises the internet, data communications may take place over the network 130 via an internet communication protocol.

The back-end components 104 may include one or more servers 140. Each server 140 may include one or more computer processors adapted and configured to execute various software applications and components of the system 100, in addition to other software applications. The server 140 may further include a database 146 that may be adapted to store data related to the operation of the vehicle 108 and its DAS features. Such data may include, for example, an autonomous driving module including one or more autonomous driving modes relating to handling, maneuvering (e.g., sporty, luxury, comfort, economy, etc.), dates and times of vehicle use, duration of vehicle use, use and settings of DAS features, speed of the vehicle (e.g., RPM or other tachometer readings), lateral and longitudinal acceleration of the vehicle 108, incidents of or near collisions of the vehicle 108, communication between the DAS features and external sources, driving context and environmental conditions accompanying DAS operation (e.g., weather, traffic, road condition, infrastructure, etc.), errors or failures of DAS features, or other data relating to use of the vehicle 108 and the DAS features, which may be uploaded to the server 140 via the network 130. The server 140 may access data stored in the database 146 when executing various functions and tasks associated with evaluating performance of the DAS.

Although the system 100 is shown to include one vehicle 108, one mobile device 110, one on-board computer 114, and one server 140, it should be understood that different numbers of vehicles 108, mobile devices 110, on-board computers 114, and/or servers 140 may be utilized. For example, the system 100 may include a plurality of servers 140 and multiple mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information, as well as periodic uploads and downloads of information, which may in turn support a thin-client embodiment of the mobile device 110 or on-board computer 114 discussed herein.

The server 140 may include a controller 155 operatively connected to the database 146 via a communication link 156. Although not shown, it should be noted that additional databases may be linked to the controller 155 in any known manner. The database(s) may be used for information relating to the DAS and/or DAS feature(s), as well as vehicle use. The controller 155 may include a program memory 160, a processor 162 (e.g., a microcontroller or a microprocessor), a random-access memory (RAM) 164, and an input/output (I/O) circuit 166—all of which may be interconnected via an address/data bus 165. It should be appreciated that although only one microprocessor 162 is shown, the controller 155 may include multiple microprocessors. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a communication link 135.

The server 140 may further include a number of software applications stored in a program memory 160. The various software applications on the server 140 may include an DAS monitoring application 141 for receiving vehicle operating information regarding the vehicle 108 and its DAS features, an autonomous feature evaluation application 142 for determining the effectiveness (e.g., scoring, ranking) of DAS features under various conditions, and a compatibility evaluation application 143 for determining the effectiveness of combinations of DAS features. The various software applications may be executed on the same computer processor or on different computer processors.

The various software applications may include various software routines stored in the program memory 160 to implement various software modules using the processor 162. Additionally, or alternatively, the software applications or routines may interact with various hardware modules that may be installed within or connected to the server 140. Such modules may implement part or all of the various exemplary methods discussed herein or other related embodiments. Such modules may include a vehicle control module for determining and implementing control decisions to operate the vehicle 108, a system status module for determining the operating status of DAS features, a monitoring module for monitoring the DAS operation of the vehicle 108, a scoring module for determining a score or grade associated with DAS performance, a ranking module for determining a rank or comparison associated with DAS performance relating to other vehicles of similar type (e.g., make, model, autonomous operator), an alert module for generating and presenting alerts associated the DAS 108, an identification module for identifying or verifying the identity of the DAS and/or operator, an information module for obtaining information regarding the autonomous operator (e.g., autonomous driving package, version, module), an update module for updating the DAS operator and/or DAS feature(s) of the vehicle 108, or other modules.

Figure 2:
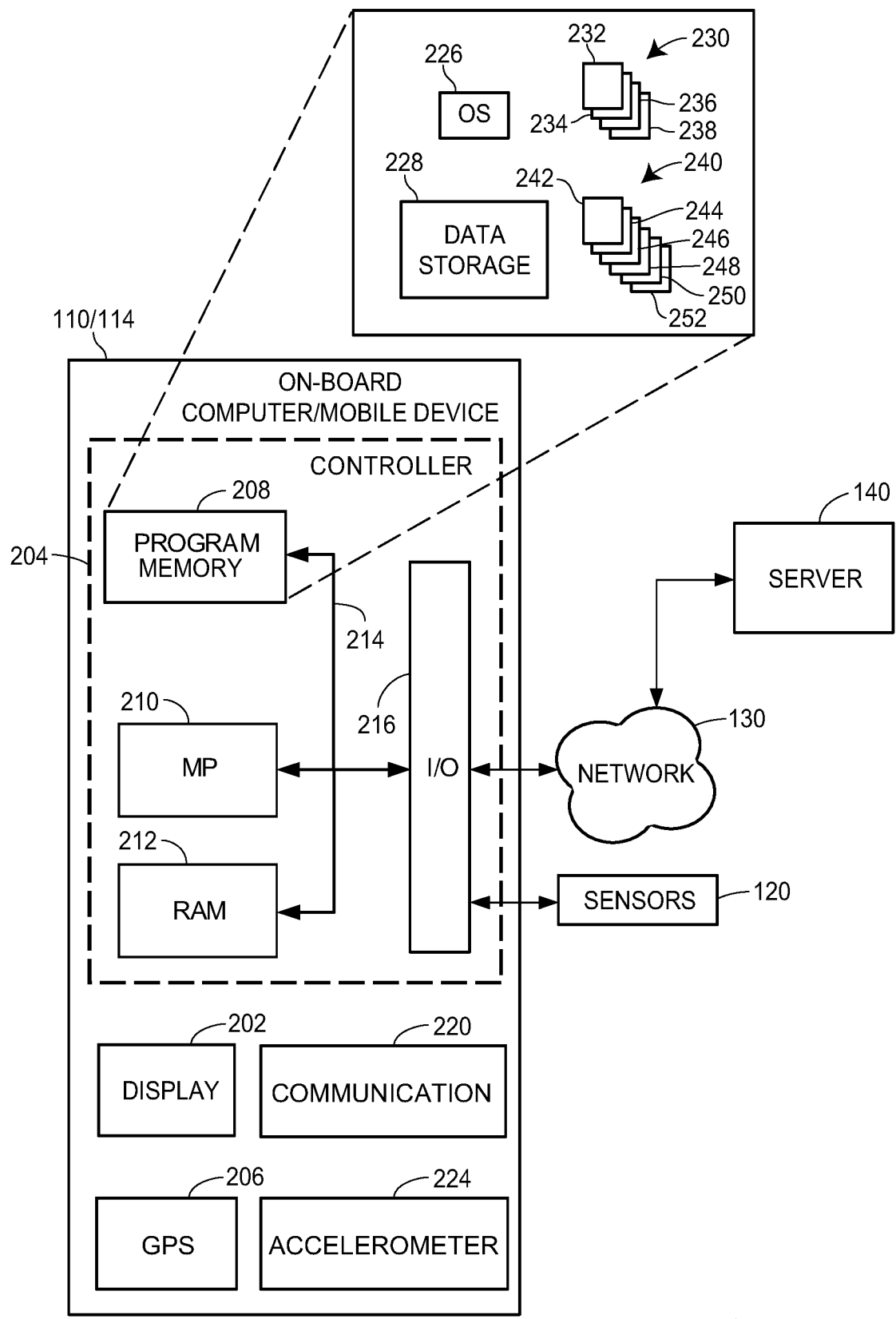
FIG. 2 illustrates a block diagram of an exemplary mobile computing device and/or on-board computer.

FIG. 2 illustrates a block diagram of an exemplary mobile device 110 and/or an exemplary on-board computer 114 consistent with the system 100 illustrated in FIG. 1. The mobile device 110 and/or on-board computer 114 may include a controller 204, a display unit 202, a GPS unit 206, a communication unit 220, and one or more sensors 224 (e.g., accelerometer, tachometer, a speedometer, gyroscope, etc.). In some embodiments, the mobile device 110 and on-board computer 114 may be integrated into a single device, or either component may perform the functions of both. The mobile device 110 or on-board computer 114 may interface with the sensors 120 to receive information regarding the DAS operation of the vehicle 108, its vehicle type, and/or its environment, which information may be used by the DAS features to operate the vehicle 108.

Similar to the controller 155, the controller 204 may include a program memory 208, one or more microcontrollers or microprocessors (MP) 210, a memory device 212 (RAM), and an I/O circuit 216, all of which are interconnected via an address/data bus 214. The program memory 208 may include an operating system 226, a data storage 228, a plurality of software applications 230, and/or a plurality of software routines 240. The operating system 226 may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for DAS operation using the on-board computer 114 and/or the mobile device 110. The data storage 228 may include data such as DAS profiles and preferences, application data for the plurality of applications 230, routine data for the plurality of routines 240, and other data related to the DAS features. In some embodiments, the controller 204 may also include, or otherwise be communicatively connected to, other data storage mechanisms such as one or more hard disk drives, optical storage drives, solid state storage devices, etc., that may reside within or external to the vehicle 108.

Similar to the controller 155 in FIG. 1, it should be appreciated that while FIG. 2 depicts one microprocessor 210, the controller 204 may include multiple microprocessors 210. Additionally, the memory of the controller 204 may include multiple RAMs 212 and multiple program memories 208. Further, although FIG. 2 depicts the I/O circuit 216 as a single block, the I/O circuit 216 may include a number of different types of I/O circuits. For example, the controller 204 may implement the RAM 212 and the program memory 208 as semiconductor memory, magnetically readable memory, or optically readable memory.

The one or more processors 210 may be adapted and configured to execute any one of the plurality of software applications 230 or any of the plurality of software routines 240 residing in the program memory 204 or elsewhere. One of the plurality of applications 230 may include a DAS operation application 232 that may be implemented as a series of machine-readable instructions for performing the various tasks associated with implementing one or more of the DAS features according to the DAS operation process. Another of the plurality of applications 230 may include an autonomous communication application 234 that may be implemented as a series of machine-readable instructions for transmitting and receiving DAS information to or from external sources via the communication unit 220. Another application of the plurality of applications 230 may include an DAS monitoring application 236 that may be implemented as a series of machine-readable instructions for sending information regarding DAS operation of the vehicle to the server 140 via the network 130. Another application of the plurality of applications 230 may include an autonomous feature evaluation application 238 that may be implemented as a series of machine-readable instructions for sending information regarding DAS operation of the vehicle to the server 140 via the network 130.

The plurality of software applications 230 may cooperate with any of the plurality of software routines 240 to perform functions relating to DAS operation, monitoring, scoring, or communication. In some embodiments, one of the plurality of software routines 240 may be an identification routine 242 that identifies the type of vehicle for DAS operation. Another of the plurality of software routines may be a configuration routine 244 to configure the operating parameters of a DAS feature. Another of the plurality of software routines 240 may be a sensor control routine 246 to transmit instructions to a sensor 120 and receive data from the sensor 120. Still another of the plurality of software routines 240 may be an autonomous control routine 248 that performs a type of autonomous control, such as collision avoidance, lane centering, and/or speed control. In some embodiments, the DAS operation application 232 may cause a plurality of autonomous control routines 248 to determine control actions required for DAS operation. Similarly, one of the plurality of software routines 240 may be a monitoring and evaluating routine 250 that monitors and scores DAS operation in comparison to proclaimed features of the DAS. Yet another of the plurality of software routines 240 may be an autonomous communication routine 252 for receiving and transmitting information between the vehicle 108 and external sources to facilitate the evaluation of the DAS features.

Any of the plurality of software routines 240 may be designed to operate independently of the software applications 230 or in conjunction with the software applications 230 to implement modules associated with the methods discussed herein using the microprocessor 210 of the controller 204. Additionally, or alternatively, the software applications 230 or software routines 234 may interact with various hardware modules that may be installed within or connected to the mobile device 110 or the on-board computer 114. Such modules may implement some or all of the various exemplary methods discussed herein or other related embodiments.

For instance, such modules may include a DAS control module for determining and implementing control decisions to autonomously operate the vehicle 108, a system status module for determining the operating status of DAS features, a monitoring module for monitoring the DAS operation of the vehicle 108, a remediation module for correcting abnormal operating states of DAS features, an alert module for generating and presenting alerts regarding the DAS 108, an identification module for identifying or verifying the identity or type of the DAS and/or DAS operator, an information module for obtaining information regarding a DAS operator or vehicle, an update module for updating a DAS feature of the DAS, and/or other modules.

When executing a DAS operation, the controller 204 of the on-board computer 114 and/or mobile device 110 may implement a vehicle control module by the DAS application 232 to communicate with the sensors 120, 126 to receive information regarding the DAS, for example, vehicle type, DAS package, and/or environment; and process that information for DAS operation of the vehicle. In some embodiments including external source communication via the communication component 122 or the communication unit 220, the controller 204 may further implement a communication module based upon the autonomous communication application 236 to receive information from external sources, such as other DASs, smart infrastructure (e.g., electronically communicating roadways, traffic signals, or parking structures), or other sources of relevant information (e.g., weather, traffic, local amenities, emergency systems/vehicles). Some external sources of information may be connected to the controller 204 via the network 130, such as the server 140 or internet-connected third-party databases (not shown). Although the DAS operation application 232 and the autonomous communication application 234 are shown as two separate applications, it is to be understood that the functions of the DAS features may be combined or separated into any number of the software applications 230 or the software routines 234.

In some embodiments, the controller 204 may further implement a monitoring module by the DAS monitoring application 236 to communicate with the server 140 to provide information regarding DAS operation. This may include information regarding settings or configurations of DAS features, data from the sensors 126 regarding the vehicle environment, data from the sensors 120 regarding the response of the DAS to its environment, communications sent or received using the communication component 122 or the communication unit 220, operating status of the DAS operation application 232 and the autonomous communication application 234, and/or commands sent from the on-board computer 114 and/or mobile device 110 to the control components (not shown) to autonomously operate the vehicle. The information may be received and stored by the server 140 implementing the DAS information monitoring application 141, and the server 140 may then determine the effectiveness of the DAS under various conditions by implementing the feature evaluation application 142 and the compatibility evaluation application 143.

Some example of sensors 120 operatively coupled to the mobile device 110 and/or the on-board computer 114 include a GPS unit 206, an accelerometer, an optical sensor, a speedometer, a tachometer, a throttle position sensor, a gyroscope, a microphone, an image capturing device, a braking detector, etc., which may provide information relating to DAS operation of the vehicle and/or other purposes. In some specific instances, the sensors 120 may also be used to monitor vehicle lane deviation, vehicle swerving, vehicle lane centering, vehicle acceleration along a single axis or multiple axes, and vehicle distance to other objects. Additionally, external sensors 126 and the sensors 120 may also be used to detect driving context, for example, proximate driving environment, e.g., accompanying weather conditions, traffic congestion, driving surface, etc. It should be appreciated that these types of sensors and measurable metrics and driving context are merely examples and that other types of sensors, measureable metrics, and driving context are envisioned. Furthermore, the communication unit 220 may communicate with other DASs, infrastructure, or other external sources of information to transmit and receive information relating to DAS operation. The communication unit 220 may communicate with the external sources via the network 130 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Additionally, the communication unit 220 may provide input signals to the controller 204 via the I/O circuit 216. The communication unit 220 may also transmit sensor data, device status information, control signals, and/or other output from the controller 204 to one or more external sensors within the vehicle 108, mobile devices 110, on-board computers 114, and/or servers 140.

The mobile device 110 and/or the on-board computer 114 may include a user-input device (not shown) for receiving instructions or information from a vehicle occupant, such as settings relating to a DAS feature. The user-input device (not shown) may include a "soft" keyboard that is presented on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving voice-input of a user.

Figure 3:
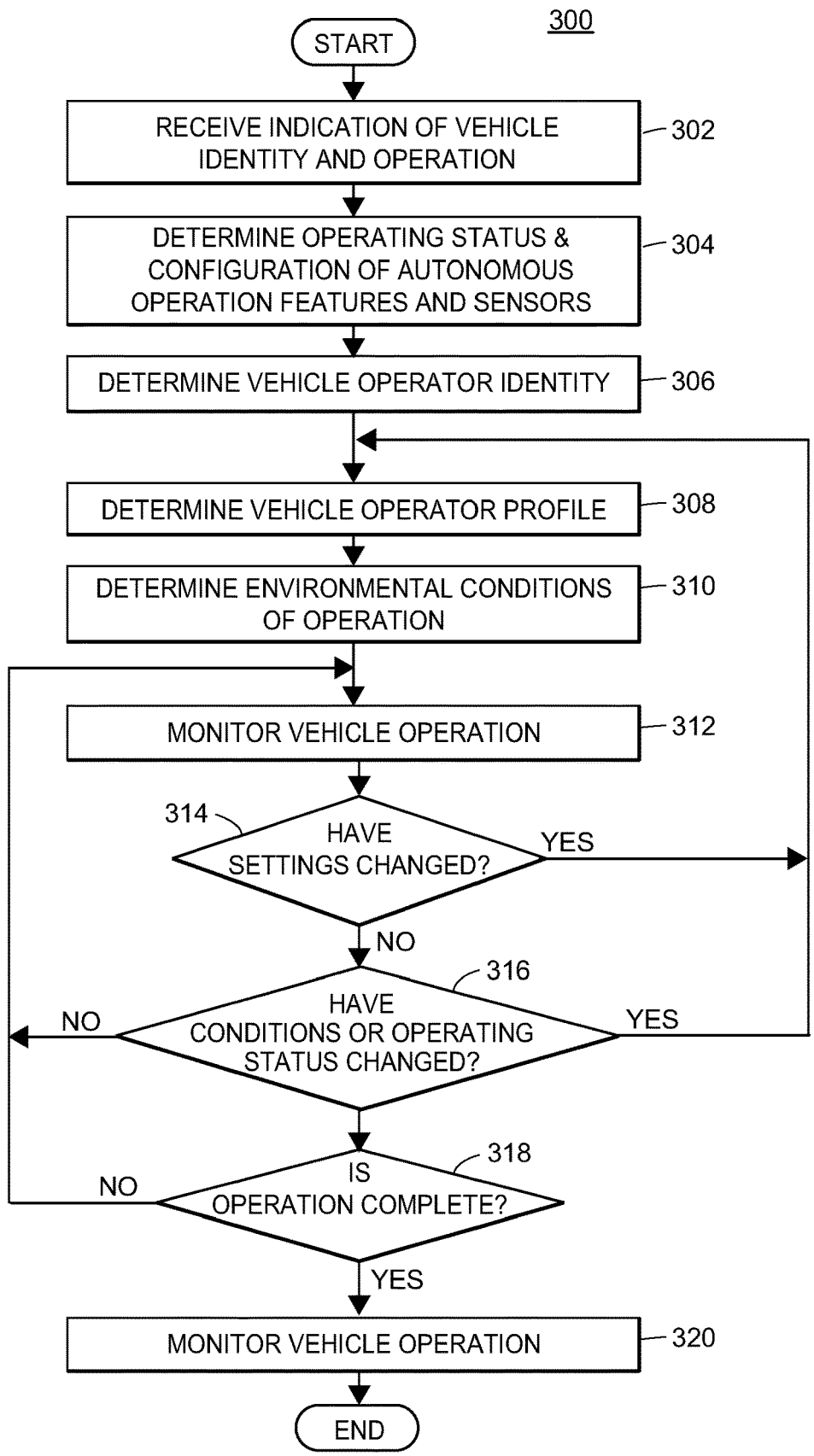
FIG. 3 illustrates a flow diagram of an exemplary monitoring method during DAS operation in accordance with the presently described embodiments.

FIG. 3 illustrates a flow diagram depicting an exemplary monitoring method 300 during DAS operation, which may be implemented by the DAS evaluation system described herein. The method 300 monitors the DAS operation of the vehicle based upon DAS use. Although this exemplary embodiment may be primarily performed by the mobile computing device 110, the method 300 may be also implemented by the on-board computer 114, the server 140, or any combination thereof. Upon receiving an indication of vehicle operation at block 302, the mobile computing device 110 may determine the configuration and operating status of the DAS features (including the sensors 120 and the communication component 122) at block 304. The identity of the autonomous operator and/or vehicle type may be determined and/or verified at block 306, which identity may be used to determine or receive an autonomous operator profile at block 308. The autonomous operator profile may contain information regarding the autonomous operator's ability to operate the vehicle and/or past use of DAS features by the DAS operator. Information from the sensors 120, 126 and/or data from external sources received via the communication component 122 may be used at block 310 to determine environmental conditions, e.g., a driving context, in which the vehicle 108 is operating. Together, this information determined at blocks 304-310 may be used at block 312 to monitor performance of the DAS operation of the vehicle; from which later may be determined a score or rank associated with similar autonomous operators and/or associated vehicle types.

Further, the method 300 may continue monitoring DAS operation of the vehicle 108 at block 314, and adjustments may be made based on any detected changes to the autonomous driver/operator and/or the driving environment. If changes are detected and/or driving conditions are determined to have changed at block 314, evaluation criteria for the DAS operation may be adjusted accordingly, in which case the blocks 308 and 310 may be repeated. When no changes have been made to the settings, the method 300 may further check for changes to the environmental conditions and/or operating status of the DAS features at block 316. If changes are determined to have occurred at block 316, corresponding historical DAS operation data may be determined accordingly as at block 314. When no changes have occurred, the method 300 may determine whether vehicle operations are ongoing or whether operation is complete at block 318. When vehicle operation is ongoing, the method 300 may continue to monitor vehicle operation at block 312. When vehicle operation is complete, information regarding operation of the vehicle may be recorded at block 320, at which point the method 300 may terminate.

More specifically, at block 302, the mobile computing device 110 and/or on-board computer 114 may receive an indication of vehicle operation. This indication may be received from the autonomous operator (either directly or through the mobile device 110), and/or it may be generated automatically. For example, the mobile device 110 and/or the on-board computer 114 may automatically generate an indication of vehicle operation when the vehicle starts operation (e.g., upon engine ignition, system power-up, movement of the vehicle 108, etc.). Prior to or upon receiving the indication of vehicle operation, the mobile computing device 110 and/or on-board computer 114 may identify the vehicle type, after which a system check may be initiated as well as the recording of information relating to DAS operation of the vehicle 108.

At block 304, the mobile computing device 110 and/or the on-board computer 114 may determine the configuration and operating status of one or more DAS features of the vehicle 108. This may include determining the configuration, settings, and/or operating status of one or more hardware or software modules for controlling part or all of the vehicle operation, aftermarket components disposed within the vehicle to provide information regarding vehicle operation, and/or sensors 120 coupled to the vehicle. In some embodiments, a software version, model version, and/or other identification of the feature or sensor may be determined. In further embodiments, the DAS feature may be tested to assess proper functioning, which may be accomplished using a test routine or other means. Additionally, the sensors 120 or the communication component 122 may be assessed to determine their operating status (e.g., quality of communication connections, signal quality, noise, responsiveness, accuracy, etc.). In some embodiments, test signals may be sent to one or more of the sensors 120, responses to which may be received and/or assessed by the on-board computer to determine operating status. In further embodiments, signals received from a plurality of sensors may be compared to determine whether any of the sensors are malfunctioning. Additionally, signals received from the sensors may be used, in some embodiments, to calibrate the sensors.

At block 306, the mobile computing device 110 and/or the on-board computer 114 may determine the identity of the autonomous operator. To determine the identity of the autonomous operator, the mobile computing device 110 and/or the on-board computer 114 may receive and process information regarding the autonomous operator. In some embodiments, the received information may include sensor data from one or more sensors 120 configured to monitor the type of vehicle. For example, information may be entered into the mobile device and/or on-board computing device regarding the autonomous operator and/or vehicle type to determine the identity of the autonomous operator. In further embodiments, the mobile device and/or on-board computing device may receive information from a mobile computing device associated with an occupant of the DAS. For example, a mobile phone may connect to the mobile computing device 110 and/or the on-board computer 114, which may identify the autonomous operator and/or vehicle type. Additional steps may be taken to verify the identity of the autonomous operator and/or vehicle type, such as comparing an autonomous operator module identifier to a list of identified autonomous operators.

At block 308, the mobile device 110 and/or on-board computing device 114 may determine and/or access options for the DAS operator and/or the vehicle type based upon the identity of the autonomous operator and/or vehicle type determined at block 306. The autonomous operator profile may include information regarding options for DAS operation of one or more vehicles, including information regarding past operation of one or more vehicles by the autonomous operator. This information may further contain past autonomous operator selections of settings for one or more DAS features for the particular type of vehicle being monitored/evaluated. In some embodiments, the mobile device 110 and/or on-board computing device 114 may request or access the autonomous operator profile based upon the determined identity. In other embodiments, the mobile device 110 and/or on-board computer 114 may generate the autonomous operator profile from information associated with the vehicle occupant. The autonomous operator profile may include information relating to one or more driving profiles of the autonomous operator. For example, the autonomous operator profile may include information relating driving patterns or preferences in a variety of driving contexts. In some embodiments, the autonomous operator profile may include information regarding default settings or features commonly used in similar type vehicles.

At block 310, the mobile device 110 and/or on-board computer 114 may determine the driving environment in which the DAS 108 is operating. Such environmental conditions may include weather, traffic, road conditions, time of day, location of operation, type of road, and/or other information relevant to operation of the vehicle. The environmental conditions may be determined based upon signals received from the external sensors 126 and/or resources received through the communication component 122, and/or from a combination of other sources. The environmental conditions may then be used in evaluating DAS performance based on driving context and/or vehicle type, and further calculating a DAS performance score for use in adjusting DAS operation of the vehicle 108.

At block 312, the mobile device 110 and/or on-board computer 114 may monitor DAS operation of the vehicle 108, including DAS operation feature control decisions, signals from the sensors 120, 126, and external data from the communication component 122. Monitoring DAS operation may include monitoring data received directly from the autonomous operator, the sensors, and/or other components, as well as summary information regarding the condition, movement, and/or surrounding environment of the vehicle 108. The mobile device 110 and/or on-board computer 114 may cause the operating data to be stored or recorded, either locally in the data storage 228 and/or via server 140 in the program memory 160 and/or the database 146. Monitoring may continue until vehicle operation is complete (e.g., the vehicle has reached its destination and shut down), including during any updates or adjustments.

At block 314, the mobile computing device 110 and/or on-board computer 114 may determine whether any changes have been made to the settings or configuration of the DAS features. If such changes or adjustments have been made, the mobile computing device 110 and/or on-board computer 114 may later adjust the evaluation of the performance of the DAS operator accordingly. In some embodiments, minor changes below a minimum change threshold may be ignored when determining whether any changes have been made. In other embodiments, the cumulate effect of a plurality of such minor changes below the minimum change threshold may be considered as a change at block 314 when the cumulative effect of the minor changes reaches and/or exceeds the minimum change threshold. When no changes to the settings or configuration of the DAS features are determined to have been made at block 314, the mobile computing device 110 and/or the on-board computer 114 may further determine whether any changes in the environmental conditions and/or operating status of the DAS features or sensors have occurred.

At block 316, the mobile computing device 110 and/or on-board computer 114 may determine whether any changes have occurred to the environmental conditions of the vehicle 108 and/or the operating status of the DAS features, sensors 120, or communication component 122. Such changes may occur when weather or traffic conditions change, when sensors 120 malfunction or become blocked by debris, and/or when the vehicle 108 leaves an area where external data is available via the communication component 122. When such changes occur, the risk levels associated with control of the vehicle 108 by the vehicle operator and the DAS features may likewise change. Therefore, it may be advantageous to later adjust the evaluation of the DAS features accordingly to account for such changes. Similar to the determination at block 314, minor changes below a minimum change threshold may be ignored at block 316, unless the cumulative effect of the changes reaches or exceeds the minimum change threshold. When no changes are determined to have occurred at block 316, the method 300 may continue to monitor the operation of the vehicle 108 until vehicle operation is determined to have ended.

At block 318, the mobile computing device 110 and/or the on-board computer 114 may determine whether DAS operation is complete. This may include determining whether a command to shut down the vehicle 108 has been received, whether the vehicle 108 has remained idle at a destination for a predetermined period of time, and/or whether the vehicle operator has exited the vehicle 108. Until operation is determined to be complete at block 318 (i.e., when the vehicle trip has concluded), the mobile computing device 110 and/or the on-board computer 114 may continue to monitor vehicle operation at block 312, as discussed above. When operation is determined to be complete at block 320, the mobile computing device 110 and/or the on-board computer 114 may further cause a record of the operation of the vehicle 108 to be made or stored. Such records may include operating data (in full or summary form) and may be used for assessing the autonomous performance of the vehicle. In some embodiments, records of operating data may be generated and stored continually during operation, or partial or completed records may be transmitted to the server 140 to be stored in the database 146.

Figure 4:
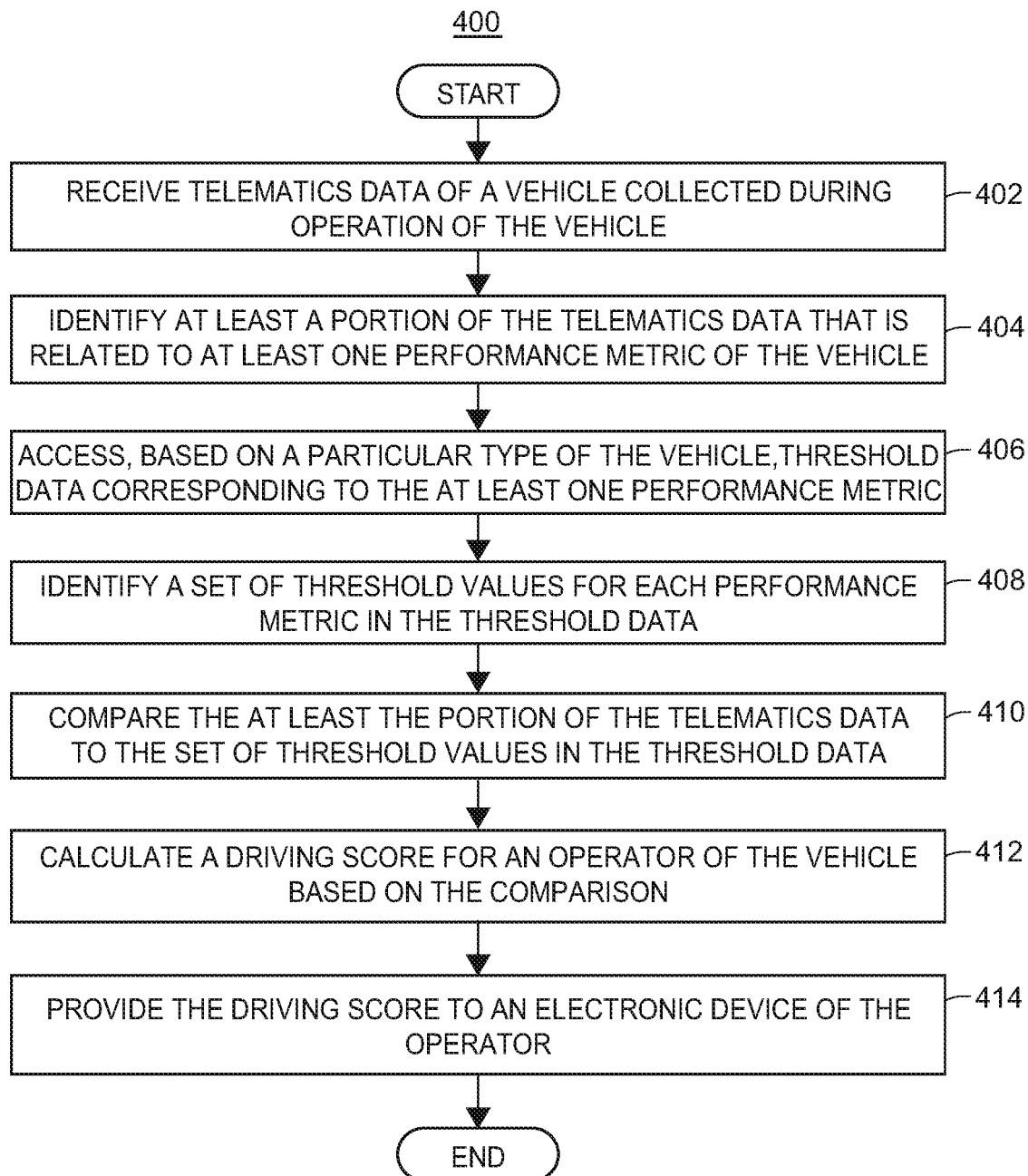
FIG. 4 depicts a flow diagram associated with collecting telematics data and assessing DAS operator performance in accordance with the presently described embodiments.

FIG. 4 depicts a flow diagram of an exemplary method 400 for evaluating performance of a DAS. The evaluation may be of a particular type of vehicle and may include consideration of the driving environment to assess an overall autonomous performance or a specific autonomous aspect associated with one or more autonomous features. The method 400 may be implemented through the system depicted in FIGS. 1 and/or 2 and include some input from vehicle sensors, external sensors, and/or external sources.

Telematics data associated with DAS performance of a particular vehicle is received by the mobile computing device 110 and/or the on-board computer 114 via one or more sensors 120 at block 402. A portion of the telematics data relates to the performance of at least one DAS operation aspect of the vehicle, such as maneuvering or handling, for example, braking, accelerating, cornering, etc. The mobile computing device 110 and/or the on-board computer 114 may identify at least a portion of the telematics data that is related to at least one performance metric of the DAS at block 404. Threshold data corresponding to the at least one performance aspect of a vehicle type that includes the DAS may be acquired from a database at block 406. The threshold data may include historical data compiled from previous testing of DASs of similar vehicle type, previous autonomous driving performances, and/or various calculations or estimations. Based on the autonomous performance metric(s), threshold values are determined from the threshold data at block 408. The threshold values for the performance metric may include a range, for example, a low threshold value representing low usage of the performance feature, a moderate threshold value representing moderate usage of the performance feature, and a high threshold value representing high usage of the performance feature. The one or more portions of the telematics data is compared to the threshold value(s) of the threshold data at block 410. An autonomous driving score is calculated based on the evaluation of the portion(s) of the telematics data at block 412. For example, the autonomous driving score may be calculated using the comparison of the portion of the telematics data to the range of threshold data of the corresponding autonomous performance feature(s). In some cases, the calculated autonomous driving score may be based on a percentile(s) of the autonomous performance metric(s) in the portion of the telematics data. The driving score can be displayed on the mobile computing device, onboard computing device, and/or transmitted to a remote server for display at block 414.

In another embodiment, the system may receive driving environment data from external sensors and/or external sources at block 402. The driving environment data, e.g., driving context data, may include data related to the driving conditions during DAS operation of the vehicle. The driving context data may include weather conditions, traffic conditions, conditions of the associated driving infrastructure, etc. Threshold data corresponding to the at least one performance aspect of the vehicle type that includes the DAS may be adjusted based on the driving environment data. Additionally, or alternatively, the compiled threshold data corresponding to the at least one performance aspect of the vehicle type includes consideration of the driving context similar to the driving context that corresponds to the driving context associated with the driving environment data received by the external sensors and/or external sources. The driving score may be calculated based on the evaluation of the portion of the telematics data, the DAS type, and the driving environment data at block 412. The driving score can be displayed on the mobile computing device, onboard computing device, and/or transmitted to a remote server for display at block 414. The DAS may be ranked among similar type DASs based on the comparative driving scores and/or the DAS may be evaluated in comparison to proclaimed autonomous aspects of similar type DASs, standard DAS aspects of similar type vehicles, and/or driving context.

Evaluation of the DAS operation of the vehicle includes assessment of one or more performance aspects generally involving vehicle handing and/or maneuvering capabilities that may be characteristics for various vehicle types, e.g., makes and models. For example, evaluation of DAS performance may be analyzed in comparison to historical DAS performance data including braking metrics, acceleration metrics, cornering metrics, etc., of similar type vehicles (e.g., make, model) and driving environment. Each metric of the DAS performance data may include one or more thresholds that represent capability or limit levels for the corresponding metric for the corresponding vehicle type. The threshold values may be determined by testing DASs and measuring relevant data during the testing. The threshold values may also be estimated or calculated based on existing threshold data, vehicle size data, and/or other factors. The threshold values may have any associated measurement unit. For example, for acceleration, braking, and cornering metrics, the data and corresponding thresholds may be measured in g-force. The testing or calculating to determine the threshold values may be determined by the user or obtained from an external resource.

Generally, the higher the threshold value, the more the DAS may be considered to being pushed to its theoretical limit of the corresponding metric. The threshold values may have associated labels indicating the level. For example, an SUV of a particular make and model may have threshold values for a braking metric: a "light" braking, a "moderate" braking, and "severe" braking. The threshold values may be represented by numerical value and/or percentiles for the performance limits (e.g., the "light" threshold may represent by a range of 0-3.5 and/or represent the 0-34th percentile, the "moderate" threshold may represented by a range of 3.6-7.5 and/or represent the 34th-66th percentile, and the "severe" threshold may be represented by a range of 7.6-10 and/or represent the 67th-100th percentile).

Different vehicle types, e.g., make and/or model of vehicles, and DAS performance aspects may have different threshold values for a certain performance metric. For example, a conversion van of a particular make and model may have the following threshold values for an acceleration metric: 2.7 for "light" acceleration, 3.2 for "moderate" acceleration, and 3.8 for "severe" acceleration; and a 2-door sedan of a particular make and model may have the following threshold values for the acceleration metric: 4.5 for "light" acceleration, 5.5 for "moderate" acceleration, and 7.0 for "severe" acceleration. Accordingly, in general, the lighter, more stable, or otherwise more agile the vehicle, the greater the threshold values may be because that vehicle will be able to handle or maneuver better than heavier, less stable, or otherwise less agile vehicles. After the performance data is compiled and the threshold values determined, the valuation of the autonomous performance/threshold data may be stored for later retrieval and calculation of the autonomous driving score and/or rank.

FIGS. 5A-5C depict example threshold values for certain autonomous performance metrics of various makes and models of vehicles. It should be appreciated that the values illustrated in FIGS. 5A-5C are merely examples and may not reflect the true performance metrics of the indicated makes and models of vehicles.

FIG. 5A indicates handling and/or maneuvering (H&M) values 542 for the various makes and models of vehicles. Generally, the handling and/or maneuvering of a vehicle is akin to a cornering performance of a vehicle and is equal to the lateral acceleration in g-force at which rollover begins in the most simplified rollover analysis of a vehicle represented by a rigid body without suspension movement or tire deflections. The further down the list of handling and/or maneuvering values 342, the better cornering ability of the vehicle (i.e., the more cornering g-forces the vehicle will be able to withstand). For example, the handling and/or maneuvering (H&M) for a 2017 Ford Econoline van is 0.95 and the H&M for a 2017 Chevrolet Impala is 1.40. FIG. 5A further indicates threshold values for a cornering performance metric, as measured in g-force, which may be calculated based on the corresponding handling and/or maneuvering testing data or historical performance data. For example, for the 2017 Ford Econoline van, the "light" usage threshold 343 (e.g., bottom 10th percentile) is 0.250, the "moderate" usage threshold 344 (e.g., 50th percentile) is 0.350, and the "severe" usage threshold 345 (e.g., 90th percentile) is 0.450.

FIG. 5B indicates acceleration values 349 (in the form of 0-60 mph times) for various makes and models of vehicles. Generally, the lower the 0-60 mph time, the better the acceleration capability of the corresponding vehicle. Accordingly, the further down the list of acceleration values 349, the higher the 0-60 mph time and the lesser the acceleration performance of the corresponding vehicle. For example, the acceleration value for a 2017 Volkswagen Routan is 16.00 seconds and the acceleration value for a 2017 Chevrolet Corvette ZR1 is 3.30 seconds. FIG. 5B further indicates threshold values for an acceleration performance metric, as measured in g-force, which may be calculated based on the corresponding 0-60 mph time and/or based on testing data. For example, for the 2017 Toyota Camry, the "light" usage threshold 346 (e.g., bottom 10th percentile) is 3.0, the "moderate" usage threshold 347 (e.g., 50th percentile) is 4.0, and the "severe" usage threshold 348 (e.g., 90th percentile) is 5.0.

FIG. 5C indicates braking values 350 (in the form of stopping distance required to decelerate from 60 mph to 0 mph) for various makes and models of vehicles. Generally, the further down the list of braking values 350, the longer the stopping distance and the lesser the braking performance of the corresponding vehicle. For example, the braking value for a 2017 Chevrolet Camaro is 115 feet and the braking value for 2017 Ford Econoline is 167 feet. FIG. 5C further indicates threshold values for a braking performance metric, as measured in g-force, which may be calculated based on the corresponding stopping distance and/or based on testing data. For example, for a 2017 Mitsubishi Eclipse, the "light" usage threshold 351 (e.g., bottom 10th percentile) is 3.5, the "moderate" usage threshold 352 (e.g., 50th percentile) is 4.5, and the "severe" usage threshold 353 (e.g., 90th percentile) is 5.5.

The driving score/rank for the DAS operator based on the evaluation described above may consider the estimated percentiles for the various performance metrics, whereby calculation of the driving score/rank utilizes one or more mathematical models, calculations, algorithms, weights, or the like. For example, if the telematics data indicates a 45th percentile for cornering, a 90th percentile for acceleration, and a 27th percentile for braking, then the calculated autonomous driving score/rank may result in an overall result in the 54th percentile (e.g., an "average" of the three percentiles). In embodiments, various performance metrics may be the same or weighted differently. Additionally, the driving score/rank can based on various conventions or scales. For example, the mean driving score can be 100, with numbers above 100 representing better driving performance and numbers below 100 representing worse driving performance. It should be appreciated that other various algorithms, calculations, assigning conventions, and/or the like are envisioned.

The calculated driving score/rank may reflect the evaluated DAS performance in a variety of ways. For example, if the DAS operator has a better-than-average driving score, a corresponding DAS insurance policy may be less than an average premium. If, however, the DAS operator has a less-than-average driving score, the corresponding DAS insurance policy may be more than an average premium.

Figure 6A:
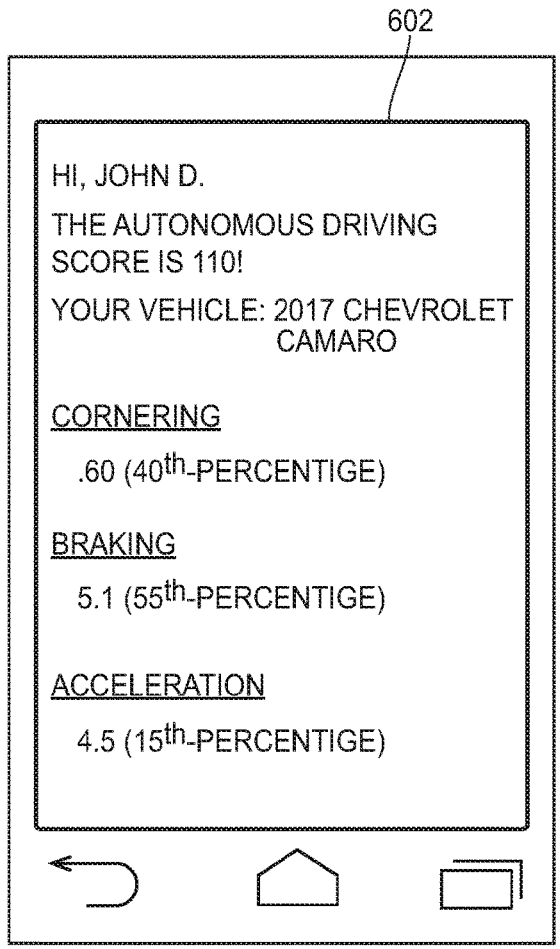
FIGS. 6A and 6B depict example interfaces associated with communicating vehicle operator performance data in accordance with the presently described embodiments.
Figure 6B:
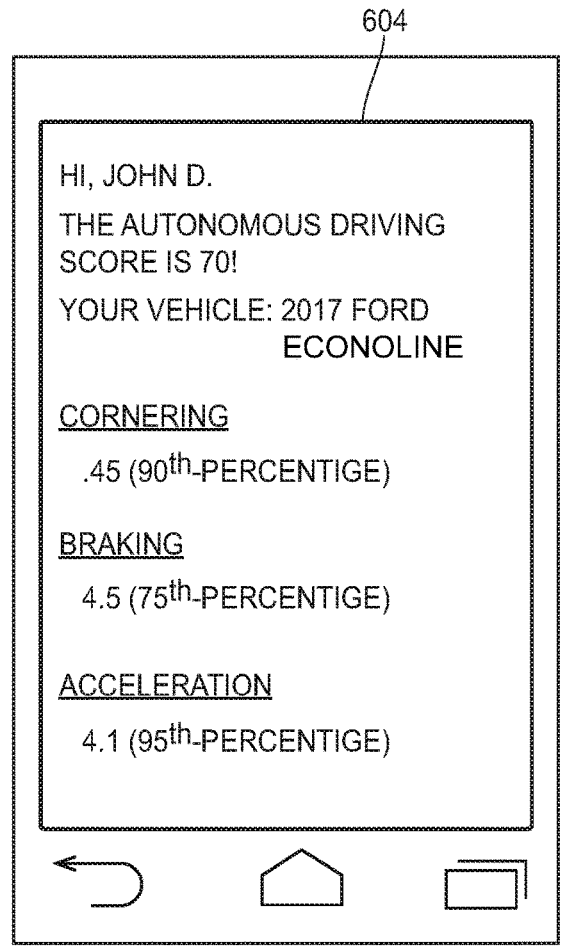

FIGS. 6A and 6B illustrate example interfaces associated with providing evaluated autonomous driving performances. The mobile device and/or on-board computer may be configured to display the interfaces and receive selections and inputs via the interfaces. A dedicated application that is configured to operate on the mobile device and/or the on-board computer may display the interfaces. It should be appreciated that the interfaces are merely examples and that alternative or additional content is envisioned. Further, it should be appreciated that alternative devices or machines may display the example interfaces.

FIG. 6A illustrates an interface 602 that notifies example customer "John D." of an autonomous driving score (as shown: 110) for the make and model of a particular vehicle. The interface 602 further includes various performance metrics (as shown: cornering, braking, and acceleration) that are calculated from telematics data of the vehicle, as well as percentile indications for the performance metrics. Generally, the DAS is either below or above for the performance metrics. As a result, an insurance provider may calculate an above-average driving score of 110, assuming that the average driving score is 100. Any resulting applications (e.g., vehicle insurance quoting) may reflect the DAS driving score.

FIG. 6B illustrates an interface 604 that notifies example customer "John D." of a DAS driving score (as shown: 70) associated with a particular make and model of DAS. The interface 604 further includes various performance metrics (as shown: cornering, braking, and acceleration) that are calculated from telematics data of the vehicle, as well as percentile indications for the performance metrics. Generally, the DAS is "above" average for all of the performance metrics. As a result, an insurance provider may calculate a below-average driving score of 70, assuming that the average driving score is 100. Any resulting applications (e.g., vehicle insurance quoting) may reflect DAS driving score.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to vehicle or automobile insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method comprising:
   receiving, by a mobile computing device, driving data indicative of a driving automation system (DAS) operation of a vehicle;
   receiving, by the mobile computing device, historical DAS operation data of other vehicles of a vehicle type that includes the vehicle;
   analyzing, by the mobile computing device, a portion of the driving data with the historical DAS operation data to calculate a DAS score for the vehicle;
   receiving, by the mobile computing device, historical DAS rating data for the vehicle type, wherein the historical DAS rating data comprises a historical DAS score associated with the vehicle type;
   analyzing, by the mobile computing device, the historical DAS score associated with the vehicle type with the DAS score for the vehicle to calculate a DAS rating for the vehicle; and
   adjusting, by the mobile computing device, the DAS operation of the vehicle based upon the DAS rating for the vehicle.

2. The computer-implemented method of claim 1, wherein the portion of the driving data is related to at least one performance metric of the DAS operation of the vehicle, the at least one performance metric including one or more of: a cornering metric, an acceleration metric, or a braking metric.

3. The computer-implemented method of claim 1, wherein
   analyzing the portion of the driving data with the historical DAS operation data includes comparing at least one performance metric of the DAS operation of the vehicle with a historical DAS performance scale of the at least one performance metric.

4. The computer-implemented method of claim 3, wherein the historical DAS performance scale includes one or more of: a cornering scale, an acceleration scale, or a braking scale.

5. The computer-implemented method of claim 4, wherein the historical DAS performance scale includes one or more thresholds.

6. The computer-implemented method of claim 1, further comprising:
   receiving, by the mobile computing device, driving context data indicative of a driving environment for the vehicle;
   analyzing, by the mobile computing device, the portion of the driving data with a corresponding portion of the driving context data to calculate a driving context score for the vehicle; and
   adjusting, by the mobile computing device, the DAS score for the vehicle based upon the driving context score for the vehicle.

7. The computer-implemented method of claim 6, wherein the driving context data include one or more of: a weather condition, a visibility condition, a traffic condition, or a road condition.

8. A computer-implemented method comprising:
   receiving, by a mobile computing device, driving data indicative of a driving automation system (DAS) operation of a vehicle;
   receiving, by the mobile computing device, historical DAS operation data of other vehicles of a vehicle type that includes the vehicle;
   receiving, by the mobile computing device, driving context data indicative of a driving environment for the vehicle;
   analyzing, by the mobile computing device, a portion of the driving data with the historical DAS operation data;
   analyzing, by the mobile computing device, the portion of the driving data with a corresponding portion of the driving context data;

calculating, by the mobile computing device, a DAS score for the vehicle based upon analyzing the portion of the driving data with the historical DAS operation data, and analyzing the portion of the driving data with the corresponding portion of the driving context data;

receiving, by the mobile computing device, historical DAS rating data for the vehicle type, wherein the historical DAS rating data comprises a historical DAS score associated with the vehicle type analyzing, by the mobile computing device, the historical DAS score associated with the vehicle type with the DAS score for the vehicle to calculate a DAS rating for the vehicle; and adjusting, by the mobile computing device, the DAS operation of the vehicle based upon the DAS rating for the vehicle.

9. The computer-implemented method of claim 8, wherein the portion of the driving data is related to at least one performance metric of the DAS operation of the vehicle, the at least one performance metric including one or more of: a cornering metric, an acceleration metric, or a braking metric.

10. The computer-implemented method of claim 8, wherein
analyzing the portion of the driving data with the historical DAS operation data includes comparing at least one performance metric of the DAS operation of the vehicle with a historical DAS performance scale of the at least one performance metric.

11. The computer-implemented method of claim 10, wherein the historical DAS performance scale includes one or more of: a cornering scale, an acceleration scale, or a braking scale.

12. The computer-implemented method of claim 11, wherein the historical DAS performance scale includes one or more thresholds.

13. The computer-implemented method of claim 8, wherein the driving context data include one or more of: a weather condition, a visibility condition, a traffic condition, or a road condition.

14. A mobile computing device comprising:
one or more processors; and
one or more memories including instructions, that when executed by the one or more processors, cause the mobile computing device to:
receive driving data indicative of a driving automation system (DAS) operation of a vehicle;
receive historical DAS operation data of other vehicles of a vehicle type that includes the vehicle;
analyze a portion of the driving data with the historical DAS operation data to calculate a DAS score for the vehicle;

receive, by the mobile computing device, historical DAS rating data for the vehicle type, wherein the historical DAS rating data comprises a historical DAS score associated with the vehicle type analyze, by the mobile computing device, the historical DAS score associated with the vehicle type with the DAS score for the vehicle to calculate a DAS rating for the vehicle; and adjust the DAS operation of the vehicle based upon the DAS seere rating for the vehicle.

15. The mobile computing device of claim 14, wherein the portion of the driving data is related to at least one performance metric of the DAS operation of the vehicle, the at least one performance metric including one or more of: a cornering metric, an acceleration metric, or a braking metric.

16. The mobile computing device of claim 14, wherein the one or more memories further include instructions, that when executed by the one or more processors, cause the mobile computing device to:
receive driving context data indicative of a driving environment for the vehicle;
analyze the portion of the driving data with a corresponding portion of the driving context data to calculate a driving context score for the vehicle; and
adjust the DAS score for the vehicle based upon the driving context score for the vehicle.

17. The mobile computing device of claim 16, wherein the driving context data include one or more of: a weather condition, a visibility condition, a traffic condition, or a road condition.

18. The computer-implemented method of claim 8, wherein the portion of the driving data is related to at least one performance metric of the DAS operation of the vehicle, the at least one performance metric including one or more of: a cornering metric, an acceleration metric, or a braking metric, and wherein analyzing the portion of the driving data with the historical DAS operation data includes comparing at least one performance metric of the DAS operation of the vehicle with a historical DAS performance scale of the at least one performance metric.

19. The mobile computing device of claim 14, wherein analyzing the portion of the driving data with the historical DAS operation data includes comparing at least one performance metric of the DAS operation of the vehicle with a historical DAS performance scale of the at least one performance metric.

20. The mobile computing device method of claim 19, wherein the historical DAS performance scale includes one or more of: a cornering scale, an acceleration scale, or a braking scale.

\* \* \* \* \*